United States Patent
Lin et al.

(10) Patent No.: US 7,814,276 B2
(45) Date of Patent: Oct. 12, 2010

(54) DATA CACHE ARCHITECTURE AND CACHE ALGORITHM USED THEREIN

(75) Inventors: Yen-Chin Lin, HsinChu (TW); Hsin-Chung Wang, Hsinchu County (TW); Chun-Hung Lin, HsinChu (TW)

(73) Assignee: Solid State System Co., Ltd., Hsin-Chu (TW)

( * ) Notice: Subject to any disclaimer, the term of this patent is extended or adjusted under 35 U.S.C. 154(b) by 401 days.

(21) Appl. No.: 11/943,228

(22) Filed: Nov. 20, 2007

(65) Prior Publication Data

US 2009/0132770 A1     May 21, 2009

(51) Int. Cl.
  *G06F 12/00* (2006.01)
(52) U.S. Cl. ..................................... 711/118
(58) Field of Classification Search ........................ None
  See application file for complete search history.

(56) References Cited

U.S. PATENT DOCUMENTS

| | | | | |
|---|---|---|---|---|
| 5,539,894 A * | 7/1996 | Webber | .................. | 711/128 |
| 5,790,130 A * | 8/1998 | Gannett | .................. | 345/587 |
| 6,526,472 B2 * | 2/2003 | Suzuki | .................. | 711/103 |
| 6,549,983 B1 * | 4/2003 | Han et al. | .................. | 711/120 |
| 7,058,784 B2 * | 6/2006 | Wang | .................. | 711/171 |
| 7,657,701 B2 * | 2/2010 | Shanmuganathan | .......... | 711/103 |
| 2002/0188805 A1 * | 12/2002 | Kottapalli | .................. | 711/119 |
| 2004/0103251 A1 * | 5/2004 | Alsup | .................. | 711/122 |
| 2005/0132129 A1 * | 6/2005 | Venkiteswaran | ............ | 711/103 |
| 2006/0069843 A1 * | 3/2006 | Emma et al. | .................. | 711/3 |
| 2007/0174551 A1 * | 7/2007 | Cornwell et al. | ............ | 711/118 |
| 2007/0245181 A1 * | 10/2007 | Suda | .................. | 714/718 |
| 2007/0283081 A1 | 12/2007 | Lasser | | |
| 2008/0002467 A1 * | 1/2008 | Tsuji | .................. | 365/185.11 |

FOREIGN PATENT DOCUMENTS

CN      1447242 A     10/2003

\* cited by examiner

*Primary Examiner*—Hiep T Nguyen
(74) *Attorney, Agent, or Firm*—WPAT, PC; Justin King

(57) ABSTRACT

The present invention provides a data cache architecture interposed between a host and a flash memory, the data cache architecture comprising: a buffer memory, receiving data from the host; a memory controller, deploying the data in the buffer memory; and a data cache memory, controlled by the memory controller according to a cache algorithm. The data cache architecture and the cache algorithm used in the data cache architecture can be used to minimize the program/erase count of the NAND type flash device.

18 Claims, 6 Drawing Sheets

| NO | Mode | LBA Addr | Sector Count | Notes | | |
|----|------|----------|--------------|-------|------------|----------------|
| 1  | W | 0x00000020 | 1 | BPB | | |
| 2  | W | 0x00000219 | 8 | ROOT | | |
| 3  | W | 0x00000021 | 1 | FAT1 | | |
| 4  | W | 0x0000011D | 1 | FAT2 | | |
| 5  | W | 0x00000239 | 128 | | Cluster-2 | File:DAT00002 |
| 6  | W | 0x000002B9 | 128 | | Cluster-6 | File:DAT00002 |
| 7  | W | 0x00000339 | 17 | | Cluster-10 | File:DAT00002 |
| 8  | W | 0x00000219 | 8 | BPB | | |
| 9  | W | 0x00000219 | 8 | BPB | | |
| 10 | W | 0x00000219 | 8 | BPB | | |
| 11 | W | 0x00000349 | 1 | | Cluster-10 | File:DAT00002 |
| 12 | W | 0x00000219 | 8 | ROOT | | |
| 13 | W | 0x00000021 | 1 | FAT1 | | |
| 14 | W | 0x0000011D | 1 | FAT2 | | |
| 15 | W | 0x00000359 | 128 | | Cluster-11 | File:DAT00003 |
| 16 | W | 0x000003D9 | 128 | | Cluster-15 | File:DAT00003 |
| 17 | W | 0x00000459 | 128 | | Cluster-19 | File:DAT00003 |

FIG.2

DATA CACHE ARCHITECTURE AND CACHE ALGORITHM USED THEREIN

BACKGROUND OF THE INVENTION

1. Field of the Invention

The present invention generally relates to a data cache architecture and a cache algorithm and, more particularly, to a data cache architecture for a NAND type flash device and a cache algorithm used in the data cache architecture to minimize the program/erase count of the NAND type flash device.

2. Description of the Prior Art

In a NAND type flash storage application product, the program/erase count is an important factor that determines the lifetime, referred to as mean time between failures (MTBF), of the flash storage application product. Unfortunately, the specification of the program/erase count decreases dramatically due to the technological progress in semiconductor processing (for example, from 65-nm process to 45-nm process).

In the prior art cache algorithm, a cache can be divided into an instruction cache and a data cache, which are used to improve the instruction code or data fetch time. That is, a CPU can access the instruction code or data from the instruction cache or the data cache directly and does not need to fetch from the main storage (external memory) with longer access time.

For a cache algorithm, the cache size, the cache tag memory size and the cache hit rate are some important factors to evaluate a cache algorithm. The larger the cache size, the more hit rate can be achieved. But also, more cache memory cost is needed and more complex cache tag memory control hardware is needed.

In the prior art cache algorithm, the cache memory is uniformly partitioned. For example, for the 32-bit CPU, the instruction cache unit is 32-bit. If the total cache size is 8 KB, then there are 2K (8 kB/32 bit) cache entries. If the total cache size is 16 KB, then there are 4K cache entries, which allows more hit rate.

From a flash memory point of view, the flash memory has an important characteristic that the data in one flash block can not be "overwritten". If a user wants to overwrite the data, this flash block must be erased first and then it can be programmed (written), which will induce one program/erase count. For an MLC (multiple level cell) flash memory, another characteristic is that a user has to write page data sequentially in one "block". That is to say, the user has to write page_1, page_2, ... sequentially in one block, instead of writing page_4 first and then writing page_2 because it is "reverse write", which will induce data error in the flash memory.

However, the host sometimes reversely writes data in one block. To solve this problem, the user has to "cache" the data first in the cache memory and write back to the flash memory when one block of data is full. By using this method, we can easily solve the "reverse write" and "data overwrite" issues of the flash memory and reduce the program/erase count of the flash memory, which can improve the flash memory lifetime.

SUMMARY OF THE INVENTION

It is an object of the present invention to provide a data cache architecture for a NAND type flash device to minimize the program/erase count of the NAND type flash device.

It is another object of the present invention to provide and a cache algorithm used in a data cache architecture for a NAND type flash device to minimize the program/erase count of the NAND type flash device.

To achieve the foregoing objects, the present invention provides a data cache architecture interposed between a host and a flash memory, the data cache architecture comprising: a buffer memory, receiving data from the host; a memory controller, deploying the data in the buffer memory; and a data cache memory, controlled by the memory controller according to a cache algorithm.

It is preferably that the buffer memory is a static random access memory (SRAM).

It is preferably that the memory controller comprises a micro-processor.

It is preferably that the data cache memory is a synchronous dynamic random access memory (SDRAM).

It is preferably that the data cache memory is partitioned into at least a plurality of large cache-size blocks and a plurality of small cache-size blocks.

It is preferably that the data cache memory is partitioned into at least a plurality of large cache-size blocks, a plurality of middle cache-size blocks and a plurality of small cache-size blocks.

It is preferably that the cache algorithm is achieved by a software application or a hardware implementation.

The present invention further provides a cache algorithm used in a data cache architecture comprising a data cache memory partitioned into at least a plurality of large cache-size blocks and a plurality of small cache-size blocks, the cache algorithm comprising steps of:

(a) determining whether a host writes data larger than or equal to a threshold number of sectors;

(b) determining whether a cache hit occurs in the large cache-size blocks;

(c) writing data to the small cache-size blocks if the host writes data smaller than the threshold number of sectors and the cache hit does not occur in the large cache-size blocks, otherwise writing data to the large cache-size blocks.

It is preferably that the step (c) in the cache algorithm comprises steps of:

(c11) determining whether a cache hit occurs in the small cache-size blocks; and (c12) writing data to the large cache-size blocks if the host writes data smaller than the threshold number of sectors and the cache hit occurs in the large cache-size blocks but does not occur in the small cache-size blocks, otherwise merging data in the small cache-size blocks to the large cache-size blocks and then writing data to the large cache-size blocks if the host writes data smaller than the threshold number of sectors and the cache hit occurs both in the large cache-size blocks and in the small cache-size blocks.

It is preferably that the step (c) in the cache algorithm comprises steps of:

(c21) determining whether a cache hit occurs in the small cache-size blocks; and (c22) writing data to the large cache-size blocks if the host writes data larger than or equal to the threshold number of sectors and the cache hit does not occur neither in the large cache-size blocks nor in the small cache-size blocks, otherwise merging data in the small cache-size blocks to the large cache-size blocks and then writing data to the large cache-size blocks if the host writes data larger than or equal to the threshold number of sectors and the cache hit occurs in the small cache-size blocks but does not occur in the large cache-size blocks.

It is preferably that the step (c) in the cache algorithm comprises steps of:

(c31) determining whether a cache hit occurs in the small cache-size blocks; and (c32) writing data to the large cache-size blocks if the host writes data larger than or equal to the threshold number of sectors and the cache hit occurs in the large cache-size blocks but does not occur in the small cache-size blocks, otherwise merging data in the small cache-size blocks to the large cache-size blocks and then writing data to the large cache-size blocks if the host writes data larger than or equal to the threshold number of sectors and the cache hit occurs both in the small cache-size blocks and in the large cache-size blocks.

BRIEF DESCRIPTION OF THE DRAWINGS

The objects, spirits and advantages of the preferred embodiment of the present invention will be readily understood by the accompanying drawings and detailed descriptions, wherein:

FIG. 2 is an example of write behavior of a host;

DETAILED DESCRIPTION OF THE PREFERRED EMBODIMENT

The present invention can be exemplified by the preferred embodiments as described hereinafter.

Figure 1:
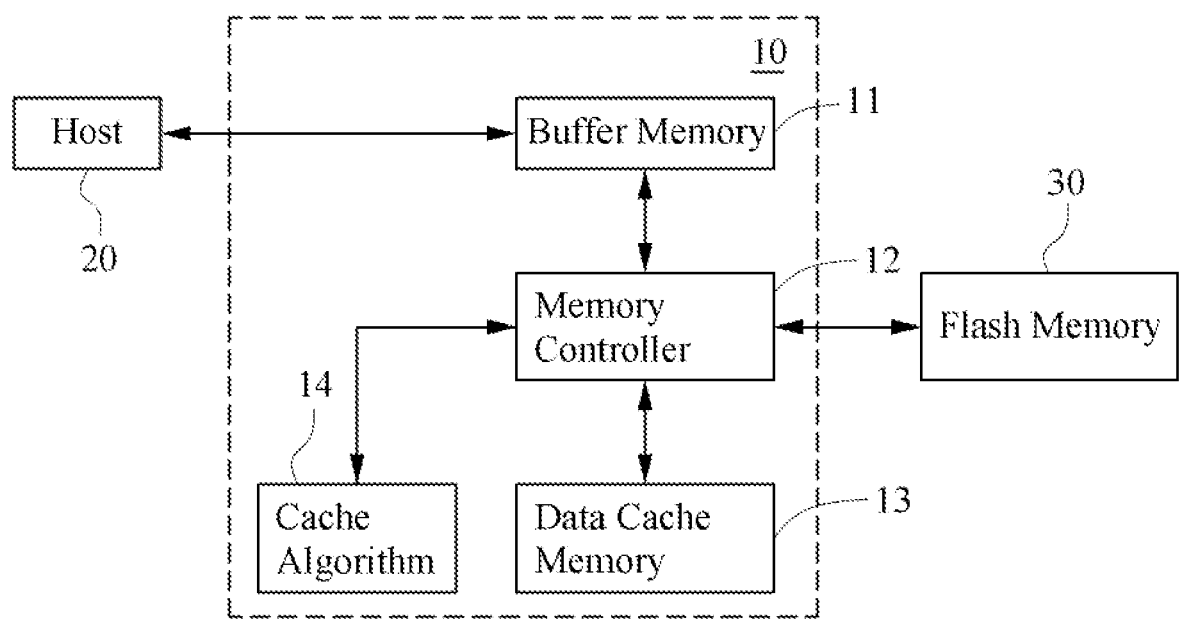
FIG. 1 is a schematic diagram of a data cache architecture in accordance with the present invention.

Please refer to FIG. 1, which is a schematic diagram of a data cache architecture in accordance with the present invention. In FIG. 1, the data cache architecture 10 is interposed between a host 20 and a flash memory 30. The data cache architecture 10 comprises a buffer memory 11, a memory controller 12 and a data cache memory. The buffer memory 11 receives data from the host 20. The memory controller 12 deploys the data in the buffer memory 11. The data cache memory 13 is controlled by the memory controller 12 according to a cache algorithm 14. In one embodiment, the buffer memory is a static random access memory (SRAM). The memory controller comprises a micro-processor. The data cache memory is a synchronous dynamic random access memory (SDRAM).

More particularly, for host data transfer, the basic data unit is a sector (512B). For example, the host may write 128 continuous sectors (64 KB) data to a flash memory or it may write 8 continuous sectors (4 kB) data to a flash memory. To reduce the program/erase count, we cache the written data into the data cache memory and write to the flash memory only after the data cache block is full. For example, if the flash block size is 256 KB, then the data cache unit can be 256 KB. If the total cache size is 16 MB, then totally there are 64 (16 MB/256 KB) cache entries. If the host sequentially writes 256 KB data to the cache (one cache block is full), then we can write this 256 KB data to the flash memory once, which does not induce an erase count.

Figure 3:
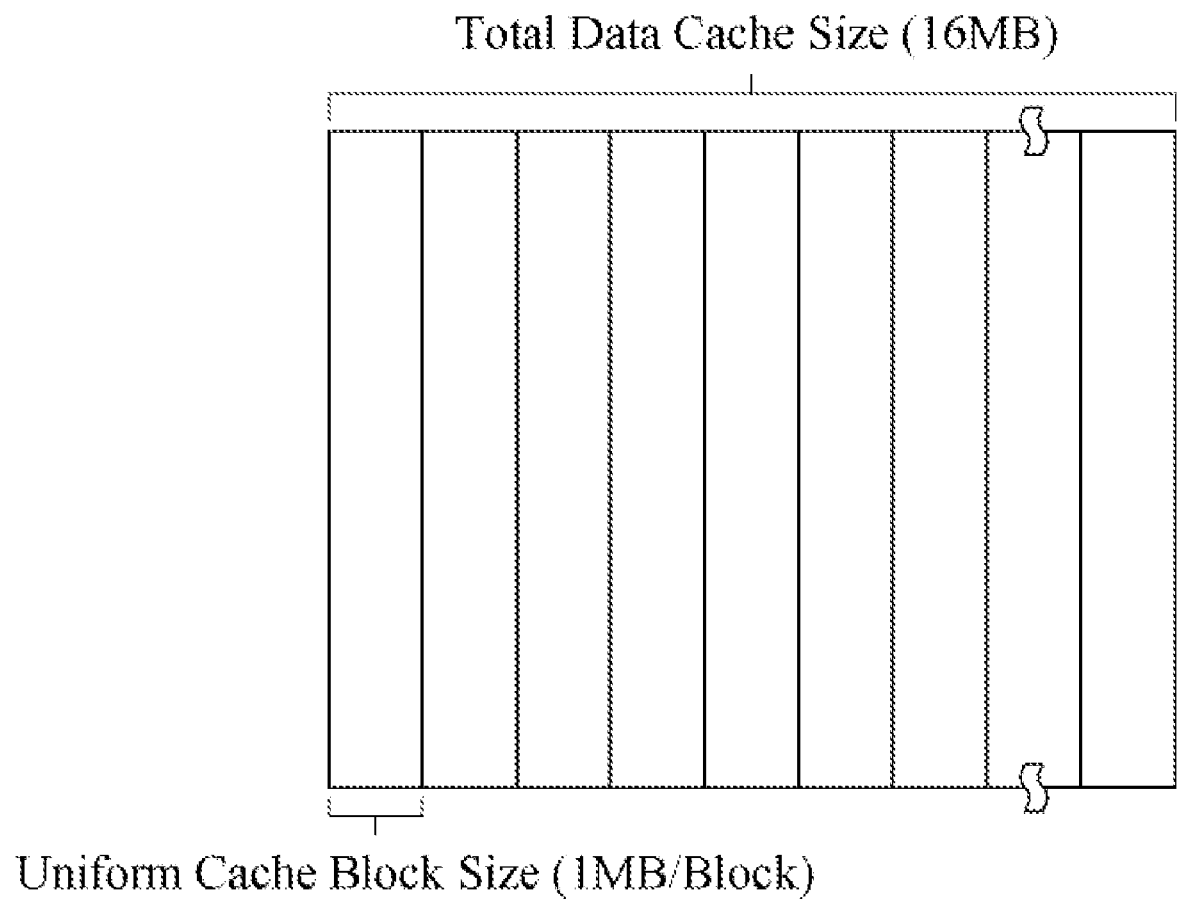
FIG. 3 is a conventional cache memory partitioned into uniform cache-size blocks.

However, the host may write data sectors of different sizes to different cache blocks. FIG. 2 is an example of write behavior of a host. In FIG. 2, the host writes 128 sectors of data that occupy one cache block. If the host writes only 8 sectors of data, these 8 sectors of data also occupies another cache block. That is to say, if the data cache memory is partitioned into cache blocks of the same size (for example, 1 MB), then the number of cache entries is limited to 16 (16 MB/1 MB), and these cache blocks will soon be occupied entirely, which results in very low the hit rate. FIG. 3 is a conventional cache memory partitioned into uniform cache-size blocks.

One method to increase the cache entries (for example, from 16 entries to 32 entries) is to increase the total cache size (for example, from 16 MB to 32 MB). However, this increases the cache memory cost.

Figure 4:
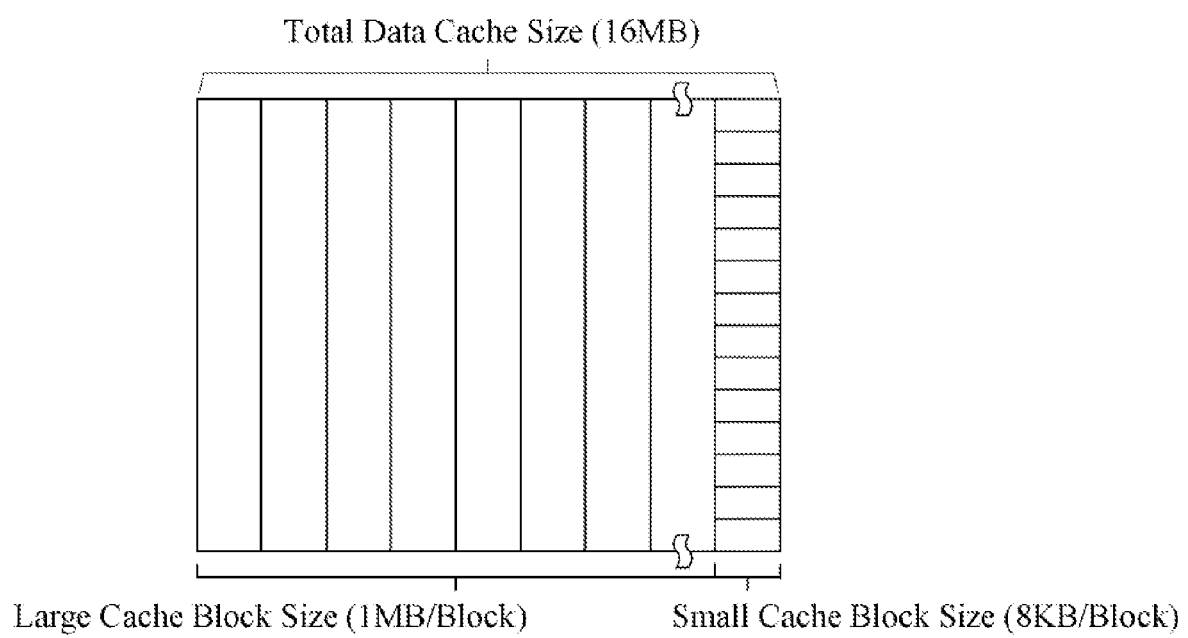
FIG. 4 is a cache memory partitioned into two-cache-size blocks in accordance with one embodiment of the present invention.

To overcome this issue, the present invention provides a data cache memory with blocks of different cache size partition to increase the cache entries with the same cache memory size. For example, the data cache memory can be partitioned into blocks of different cache sizes, i.e. large blocks for large data sector count write (for example, 1 MB per block) and small blocks for small data sector count write (for example, 8 KB per block). Please refer to FIG. 4, which is a cache memory partitioned into two-cache-size blocks in accordance with one embodiment of the present invention. In FIG. 4, if the total cache size of a data cache memory is 16 MB, the data cache memory can be partitioned into 15 large blocks with 1 MB block size and 128 small blocks with 8 KB block size. Accordingly, there are totally 143 (15+128) entries that can increase the hit rate.

Figure 5:
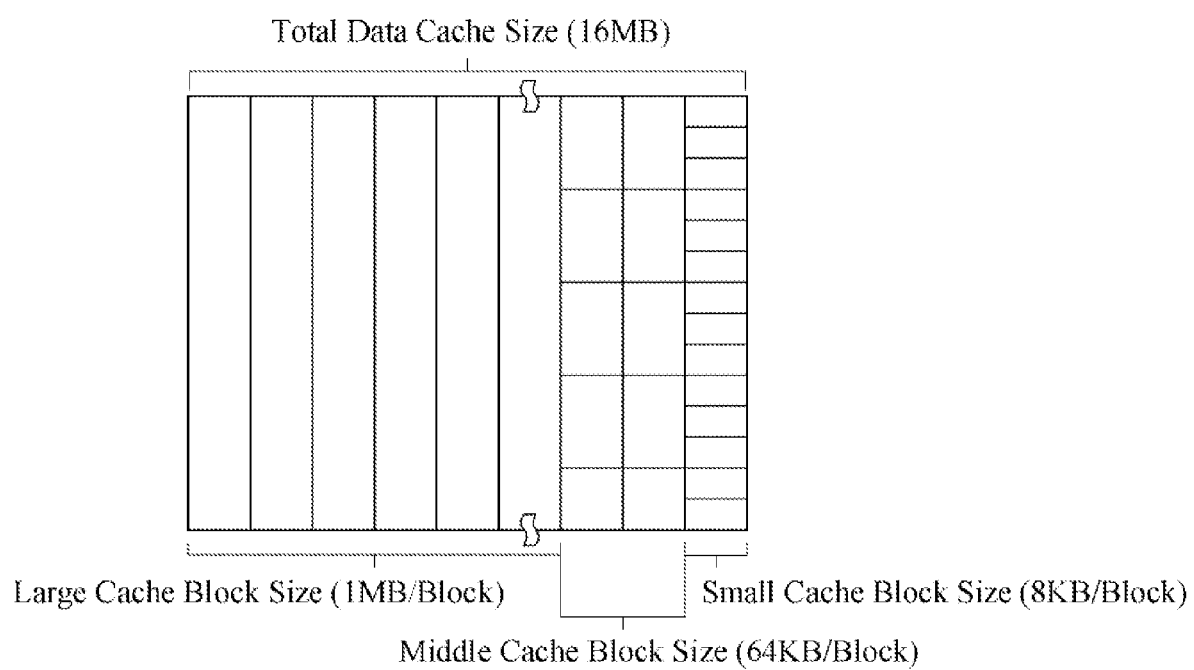
FIG. 5 is a cache memory partitioned into multiple-cache-size blocks in accordance with another embodiment of the present invention.

It is preferably that the data cache memory can be partitioned into at least a plurality of large cache-size blocks, a plurality of middle cache-size blocks and a plurality of small cache-size blocks, as shown in FIG. 5. In FIG. 5, if the total cache size of a data cache memory is 16 MB, the data cache memory can be partitioned into 13 large blocks with 1 MB block size, 32 middle blocks with 64 KB and 128 small blocks with 8 KB block size. Accordingly, there are totally 173 (13+32+128) entries that can increase the hit rate.

In the present invention, a cache algorithm is provided based on the NAND type flash memory and the host characteristic, which is totally different from the prior art cache algorithm used in the CPU system. A multiple cache block size partition algorithm is disclosed to determine which block (large block or small block) will the host write the data to.

Figure 6:
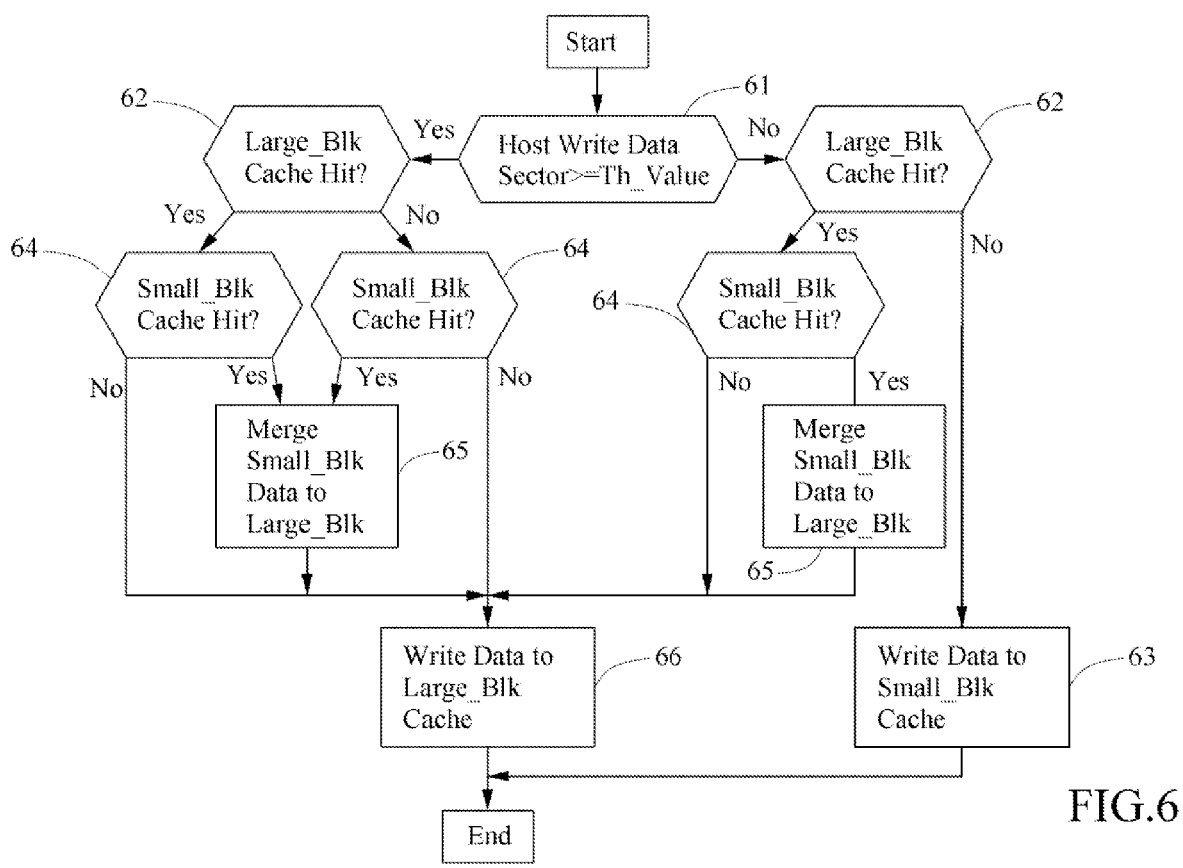
FIG. 6 is a flow-chart showing a cache algorithm used in a data cache architecture in accordance with the present invention.

FIG. 6 is a flow-chart showing a cache algorithm used in a data cache architecture in accordance with the present invention. The cache algorithm comprises steps described hereinafter.

In Step 61, it is determined whether a host writes data larger than or equal to a threshold number of sectors.

Then in Step 62, it is determined whether a cache hit occurs in the large cache-size blocks.

The host writes data to the small cache-size blocks (in Step 63) if the host writes data smaller than the threshold number of sectors and the cache hit does not occur in the large cache-size blocks; otherwise the host writes data to the large cache-size blocks (in Step 66).

In Step 64, it is determined whether a cache hit occurs in the small cache-size blocks.

The host writes data to the large cache-size blocks (in Step 66) if the host writes data smaller than the threshold number of sectors and the cache hit occurs in the large cache-size blocks but does not occur in the small cache-size blocks; otherwise the data in the small cache-size blocks is merged to the large cache-size blocks (in Step 65) and then the host writes data to the large cache-size blocks (in Step 66) if the host writes data smaller than the threshold number of sectors and the cache hit occurs both in the large cache-size blocks and in the small cache-size blocks.

The host writes data to the large cache-size blocks (in Step 66) if the host writes data larger than or equal to the threshold number of sectors and the cache hit does not occur neither in the large cache-size blocks nor in the small cache-size blocks; otherwise the data in the small cache-size blocks is merged to the large cache-size blocks (in Step 65) and then the host writes data to the large cache-size blocks (in Step 66) if the host writes data larger than or equal to the threshold number of sectors and the cache hit occurs in the small cache-size blocks but does not occur in the large cache-size blocks.

The host writes data to the large cache-size blocks (in Step 66) if the host writes data larger than or equal to the threshold number of sectors and the cache hit occurs in the large cache-size blocks but does not occur in the small cache-size blocks; otherwise the data in the small cache-size blocks is merged to the large cache-size blocks (in Step 65) and then the host writes data to the large cache-size blocks (in Step 66) if the host writes data larger than or equal to the threshold number of sectors and the cache hit occurs both in the small cache-size blocks and in the large cache-size blocks.

It is preferably that the cache algorithm is achieved by a software application or a hardware implementation.

By using the multiple cache block size partition and the related cache algorithm to handle the host data write, the user can easily improve the cache hit rate without increasing the total cache size and, in the mean time, improve the flash write performance (SDRAM write speed is higher than flash write speed) and life time.

According to the above discussion, it is apparent that the present invention discloses a data cache architecture for a NAND type flash device and a cache algorithm used in the data cache architecture to minimize the program/erase count of the NAND type flash device. Therefore, the present invention is novel, useful and non-obvious.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A data cache architecture interposed between a host and a flash memory, the data cache architecture comprising:
    a buffer memory, receiving data from the host;
    a memory controller, deploying the data in the buffer memory; and
    a data cache memory, controlled by the memory controller according to a cache algorithm;
    wherein the data cache memory is partitioned into at least a plurality of large cache-size blocks and a plurality of small cache-size blocks,
    wherein the cache algorithm comprises steps of:
    (a) determining whether the host writes data larger than or equal to a threshold number of sectors;
    (b) determining whether a cache hit occurs in the large cache-size blocks; and
    (c) writing data to the small cache-size blocks if the host writes data smaller than the threshold number of sectors and the cache hit does not occur in the large cache-size blocks, otherwise writing data to the large cache-size blocks.

2. The data cache architecture as recited in claim 1, wherein the buffer memory is a static random access memory (SRAM).

3. The data cache architecture as recited in claim 1, wherein the memory controller comprises a micro-processor.

4. The data cache architecture as recited in claim 1, wherein the data cache memory is a synchronous dynamic random access memory (SDRAM).

5. The data cache architecture as recited in claim 1, wherein the data cache memory is further partitioned into at least a plurality of middle cache-size blocks.

6. The data cache architecture as recited in claim 1, wherein the cache algorithm is achieved by a software application or a hardware implementation.

7. The data cache architecture as recited in claim 1, wherein the step (c) in the cache algorithm comprises steps of:
    (c11) determining whether a cache hit occurs in the small cache-size blocks; and
    (c12) writing data to the large cache-size blocks if the host writes data smaller than the threshold number of sectors and the cache hit occurs in the large cache-size blocks but does not occur in the small cache-size blocks, otherwise merging data in the small cache-size blocks to the large cache-size blocks and then writing data to the large cache-size blocks if the host writes data smaller than the threshold number of sectors and the cache hit occurs both in the large cache-size blocks and in the small cache-size blocks.

8. The data cache architecture as recited in claim 1, wherein the step (c) in the cache algorithm comprises steps of:
    (c21) determining whether a cache hit occurs in the small cache-size blocks; and
    (c22) writing data to the large cache-size blocks if the host writes data larger than or equal to the threshold number of sectors and the cache hit does not occur neither in the large cache-size blocks nor in the small cache-size blocks, otherwise merging data in the small cache-size blocks to the large cache-size blocks and then writing data to the large cache-size blocks if the host writes data larger than or equal to the threshold number of sectors and the cache hit occurs in the small cache-size blocks but does not occur in the large cache-size blocks.

9. The data cache architecture as recited in claim 1, wherein the step (c) in the cache algorithm comprises steps of:
    (c31) determining whether a cache hit occurs in the small cache-size blocks; and
    (c32) writing data to the large cache-size blocks if the host writes data larger than or equal to the threshold number of sectors and the cache hit occurs in the large cache-size blocks but does not occur in the small cache-size blocks, otherwise merging data in the small cache-size blocks to the large cache-size blocks and then writing data to the large cache-size blocks if the host writes data larger than or equal to the threshold number of sectors and the cache hit occurs both in the small cache-size blocks and in the large cache-size blocks.

10. A cache algorithm used in a data cache architecture comprising a data cache memory partitioned into at least a plurality of large cache-size blocks and a plurality of small cache-size blocks, the cache algorithm comprising steps of:
    (a) determining whether a host writes data larger than or equal to a threshold number of sectors;
    (b) determining whether a cache hit occurs in the large cache-size blocks;
    (c) writing data to the small cache-size blocks if the host writes data smaller than the threshold number of sectors and the cache hit does not occur in the large cache-size blocks, otherwise writing data to the large cache-size blocks.

11. The cache algorithm as recited in claim 10, wherein the step (c) comprises steps of:
  (c11) determining whether a cache hit occurs in the small cache-size blocks; and
  (c12) writing data to the large cache-size blocks if the host writes data smaller than the threshold number of sectors and the cache hit occurs in the large cache-size blocks but does not occur in the small cache-size blocks, otherwise merging data in the small cache-size blocks to the large cache-size blocks and then writing data to the large cache-size blocks if the host writes data smaller than the threshold number of sectors and the cache hit occurs both in the large cache-size blocks and in the small cache-size blocks.

12. The cache algorithm as recited in claim 10, wherein the step (c) comprises steps of:
  (c21) determining whether a cache hit occurs in the small cache-size blocks; and
  (c22) writing data to the large cache-size blocks if the host writes data larger than or equal to the threshold number of sectors and the cache hit does not occur neither in the large cache-size blocks nor in the small cache-size blocks, otherwise merging data in the small cache-size blocks to the large cache-size blocks and then writing data to the large cache-size blocks if the host writes data larger than or equal to the threshold number of sectors and the cache hit occurs in the small cache-size blocks but does not occur in the large cache-size blocks.

13. The cache algorithm as recited in claim 10, wherein the step (c) comprises steps of:
  (c31) determining whether a cache hit occurs in the small cache-size blocks; and
  (c32) writing data to the large cache-size blocks if the host writes data larger than or equal to the threshold number of sectors and the cache hit occurs in the large cache-size blocks but does not occur in the small cache-size blocks, otherwise merging data in the small cache-size blocks to the large cache-size blocks and then writing data to the large cache-size blocks if the host writes data larger than or equal to the threshold number of sectors and the cache hit occurs both in the small cache-size blocks and in the large cache-size blocks.

14. A data cache architecture interposed between a host and a memory, the data cache architecture comprising:
  a buffer memory, receiving data from the host;
  a memory controller, deploying the data in the buffer memory; and
  a data cache memory, partitioned into at least a plurality of large cache-size blocks and a plurality of small cache-size blocks, controlled by the memory controller according to a cache algorithm;
  wherein the cache algorithm comprises steps of:
  determining whether the host writes data larger than or equal to a threshold number of sectors;
  determining whether a cache hit occurs in the large cache-size blocks;
  if the host writes data which is not larger than the threshold number of sectors and the cache hit does not occur in the large cache-size blocks, writing data to the small cache-size blocks.

15. A data cache architecture as recited in claim 14, further comprising:
  determining whether a cache hit occurs in the small cache-size blocks.

16. A data cache architecture as recited in claim 15, further comprising:
  if the host writes data which is not larger than the threshold number of sectors and the cache hit occurs in the large cache-size blocks, then,
    if the cache hit does not occur in the small cache-size blocks, writing data to the large cache-size blocks, otherwise, merging data in the small cache-size blocks to the large cache-size blocks prior to writing data to the large cache-size blocks.

17. A data cache architecture as recited in claim 15, further comprising:
  if the host writes data which is larger than the threshold number of sectors, and the cache hit does not occur in the small cache-size blocks, then writing data to the large cache-size blocks, otherwise, merging data in the small cache-size blocks to the large cache-size blocks prior to writing data to the large cache-size blocks.

18. A cache algorithm used in a data cache architecture, comprising:
  a data cache memory partitioned into at least a plurality of large cache-size blocks and a plurality of small cache-size blocks, the cache algorithm comprising steps of:
  determining whether a cache hit occurs in the small cache-size blocks;
  determining whether the host writes data larger than or equal to a threshold number of sectors; and
  merging the data in the small cache-size blocks to the large cache-size blocks if the host writes data which is larger than or equal to the threshold number of sectors and the cache hit occurs in the smaller cache-size blocks.

* * * * *